(12) United States Patent
Sugimoto et al.

(10) Patent No.: US 8,479,369 B2
(45) Date of Patent: Jul. 9, 2013

(54) DEVICE AND METHOD FOR MOUNTING VEHICLE INSTRUMENT PANEL

(75) Inventors: Tomohiro Sugimoto, Utsunomiya (JP); Mitsugu Takahashi, Yokohama (JP); Masaru Maruo, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 309 days.

(21) Appl. No.: 12/866,429

(22) PCT Filed: Jan. 16, 2009

(86) PCT No.: PCT/JP2009/050523
§ 371 (c)(1),
(2), (4) Date: Aug. 5, 2010

(87) PCT Pub. No.: WO2009/101835
PCT Pub. Date: Aug. 20, 2009

(65) Prior Publication Data
US 2010/0319182 A1 Dec. 23, 2010

(30) Foreign Application Priority Data

Feb. 12, 2008 (JP) .................................. 2008-030487
Feb. 12, 2008 (JP) .................................. 2008-030488

(51) Int. Cl.
*B23P 11/00* (2006.01)
*B23P 21/00* (2006.01)
*B23P 19/00* (2006.01)

(52) U.S. Cl.
USPC .............................. 29/525.01; 29/714; 29/822

(58) Field of Classification Search
USPC ................... 29/428, 525.01, 822, 714, 281.4, 29/559; 269/55; 901/2
See application file for complete search history.

(56) References Cited

U.S. PATENT DOCUMENTS
2007/0112458 A1   5/2007   Kondo et al.

FOREIGN PATENT DOCUMENTS
JP   05-139350 A   6/1993
JP   2005-014132 A   1/2005
JP   2005-193340 A   7/2005

*Primary Examiner* — John C Hong
(74) *Attorney, Agent, or Firm* — Arent Fox LLP

(57) ABSTRACT

A device for mounting a vehicle instrumental panel has an assist machine and work robots. The assist machine has an instrument panel holding mechanism for holding an instrument panel, conveys the instrument panel, and has an assist function for holding the weight of the instrument panel. The work robots have connection mechanisms removably connected to the instrument panel holding mechanism and operate the instrument panel holding mechanism to place the instrument panel in a vehicle interior.

10 Claims, 14 Drawing Sheets

DEVICE AND METHOD FOR MOUNTING VEHICLE INSTRUMENT PANEL

TECHNICAL FIELD

The present invention relates to an apparatus (device) for and a method of installing (mounting) a vehicle instrument panel in the passenger compartment of a motor vehicle.

BACKGROUND ART

Automobile assembling lines, for example, carry out a process of automatically installing an instrument panel, which is one of heavy components, into the passenger compartment of an automobile body using a robot.

An apparatus for installing an instrument panel assembly disclosed in Japanese Laid-Open Patent Publication No. 05-139350, for example, is known for use in such a process. As shown in FIG. 14, in the installing apparatus, a line 4 for supplying instrument panel assemblies 3 is provided in parallel to an assembling line 2 which feeds automobile bodies 1.

The supplying line 4 includes three types of assembling tools 5a, 5b, 5c disposed at the terminal end thereof. Appropriate instrument panel assemblies 3 are fed respectively to the assembling tools 5a, 5b, 5c.

A gantry robot 6 is provided which extends from the assembling line 2 to the terminal end of the supplying line 4. The gantry robot 6 has a robot arm 6a with a chuck 7a mounted on the distal end thereof. The chuck 7a can be coupled to a chuck 7b mounted on an end of each of the assembling tools 5a, 5b, 5c.

Multijoint robots 8 are disposed on respective both sides of a body 1. Each of the multijoint robots 8 has an arm which supports, on its distal end, a nut runner (not shown) for fastening an instrument panel assembly 3 to the body 1 with bolts, and a plurality of cameras (not shown) for measuring the position of the body 1 that is carried on the assembling line 2 and measuring the positions of bolt holes through which the bolts are inserted when the instrument panel assembly 3 is fastened to the body 1 by the nut runner.

When the gantry robot 6 is operated, it carries an instrument panel assembly 3 which is supported by the assembling tool 5a, 5b or 5c to a given installing position in the passenger compartment of the body 1. It is considerably complex to control the operation of the gantry robot 6, and it is difficult to position the heavy instrument panel assembly 3 at the given installing position.

DISCLOSURE OF INVENTION

The present invention has been made to solve the above problems. It is an object of the present invention to provide an apparatus for and a method of installing a vehicle instrument panel quickly and efficiently in the passenger compartment of a motor vehicle.

The present invention is concerned with an apparatus for installing a vehicle instrument panel in the passenger compartment of a motor vehicle.

The installing apparatus comprises a first working mechanism including instrument panel gripping means for gripping the instrument panel, and automatically feeding the instrument panel, the first working mechanism having an assistive function to bear the weight of the instrument panel, and a second working mechanism for operating the instrument panel gripping means to put the instrument panel into the passenger compartment, the second working mechanism including coupling means for being detachably coupled to the instrument panel gripping means.

The installing apparatus alternatively comprises a first working mechanism including instrument panel gripping means for gripping the instrument panel, and automatically feeding the instrument panel, the first working mechanism having an assistive function to bear the weight of the instrument panel, and a second working mechanism for operating the instrument panel gripping means to put the instrument panel into the passenger compartment, the second working mechanism including coupling means for being detachably coupled to the instrument panel gripping means, wherein the second working mechanism includes bolt tightening means for fastening with bolts the instrument panel at an instrument panel installing position in the vehicle.

The present invention is also concerned with a method of installing a vehicle instrument panel in the passenger compartment of a motor vehicle.

The installing method comprises the steps of gripping the instrument panel with instrument panel gripping means of a first working mechanism and automatically feeding the instrument panel to an operation start position of a second working mechanism, coupling the second working mechanism to the instrument panel gripping means when the instrument panel is fed to the operation start position, operating the instrument panel gripping means with the second working mechanism to put the instrument panel into the passenger compartment while the weight of the instrument panel is being borne by the first working mechanism, and fixing the instrument panel in the passenger compartment.

The installing method alternatively comprises the steps of gripping the instrument panel with instrument panel gripping means of a first working mechanism and automatically feeding the instrument panel to an operation start position of a second working mechanism, coupling the second working mechanism to the instrument panel gripping means when the instrument panel is fed to the operation start position, operating the instrument panel gripping means with the second working mechanism to put the instrument panel into the passenger compartment while the weight of the instrument panel is being borne by the first working mechanism, and fastening with bolts the instrument panel at an instrument panel installing position in the passenger compartment with bolt tightening means mounted on the second working mechanism.

According to the present invention, the first working mechanism has an assistive function to bear the weight of the instrument panel. Accordingly, when the second working mechanism works on the instrument panel, the load imposed on the second working mechanism by the instrument panel is effectively reduced. The second working mechanism can thus be reduced in size, so that the installing apparatus can easily be reduced in size and simplified as a whole, and the process of installing the instrument panel can be performed quickly and efficiently as the effect of inertia is reduced.

When the second working mechanism is to be shut down for maintenance, etc., the second working mechanism is separated from the first working mechanism and placed in a retracted position. Then, the worker can easily install the instrument panel under the assistive action of the first working mechanism.

Furthermore, the second working mechanism has the bolt tightening means for fastening with bolts the instrument panel at the instrument panel installing position in the vehicle. Therefore, the floor space occupied by the entire equipment can be reduced, resulting in an increased space efficiency.

BEST MODE FOR CARRYING OUT THE INVENTION

Figure 1:
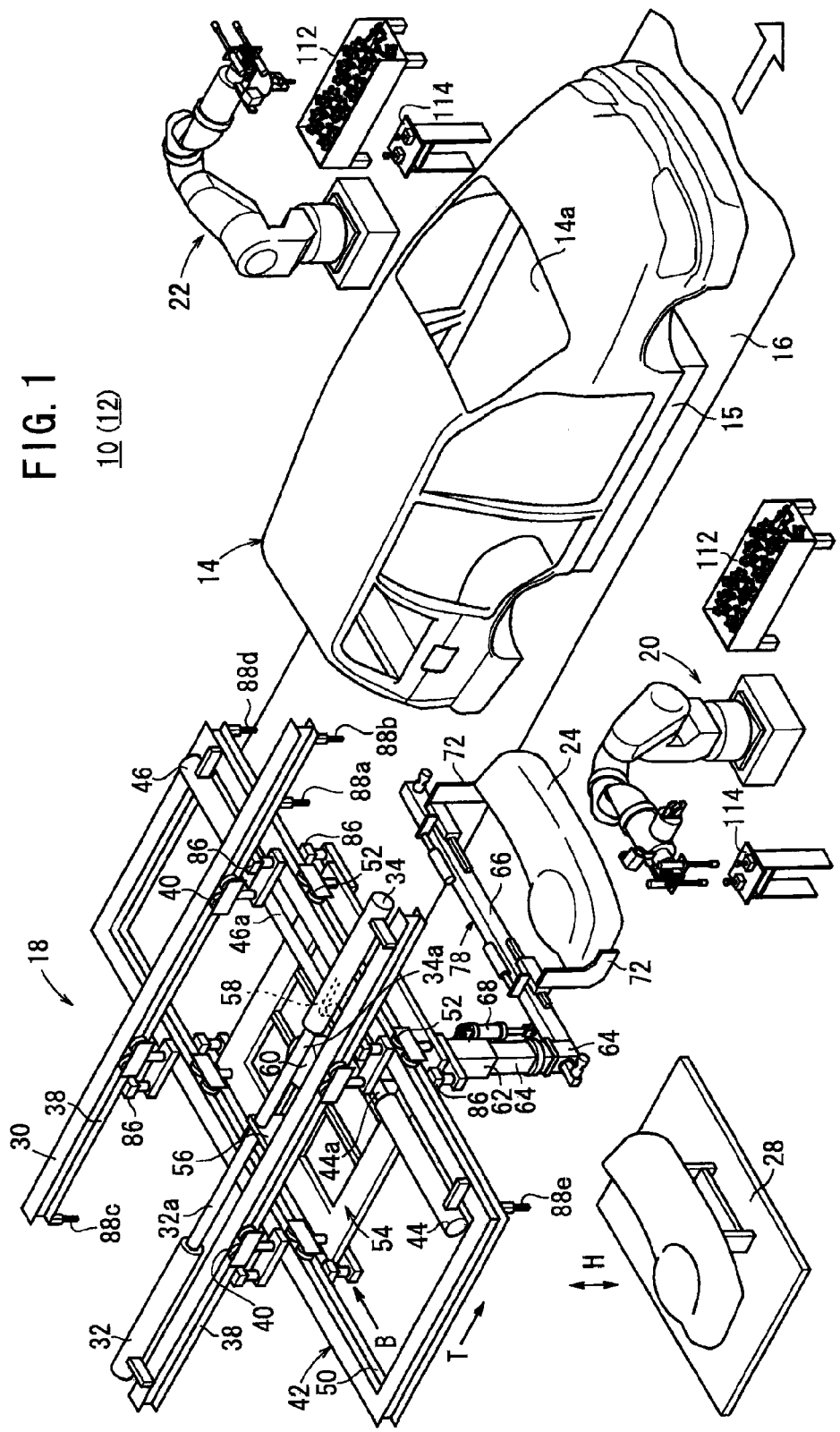
FIG. 1 is a perspective view of an assembling line where an apparatus for installing a vehicle instrument panel according to a first embodiment of the present invention is disposed.

FIG. 1 is a perspective view of an assembling line 12 where an apparatus 10 for installing a vehicle instrument panel according to a first embodiment of the present invention is disposed.

The assembling line 12 includes a feed path 16 for pitch-feeding an automobile body (motor vehicle) 14 placed on a carriage 15 to an instrument panel installing station. The installing apparatus 10 comprises an assistive machine (first working mechanism) 18, a right working robot (second working mechanism) 20 and a left working robot (second working mechanism) 22 which are disposed one on each side of the automobile body 14. The installing apparatus 10 automatically installs an instrument panel 24 in a passenger compartment 14a of the automobile body 14.

The instrument panel 24 has two reference holes (not shown) defined in each of its opposite ends in the longitudinal directions thereof (in the transverse directions of the automobile body), and also has a grip hole 26 (see FIG. 2) defined in each of its opposite ends which is engageable by an instrument panel gripping means 78 to be described later.

Figure 2:
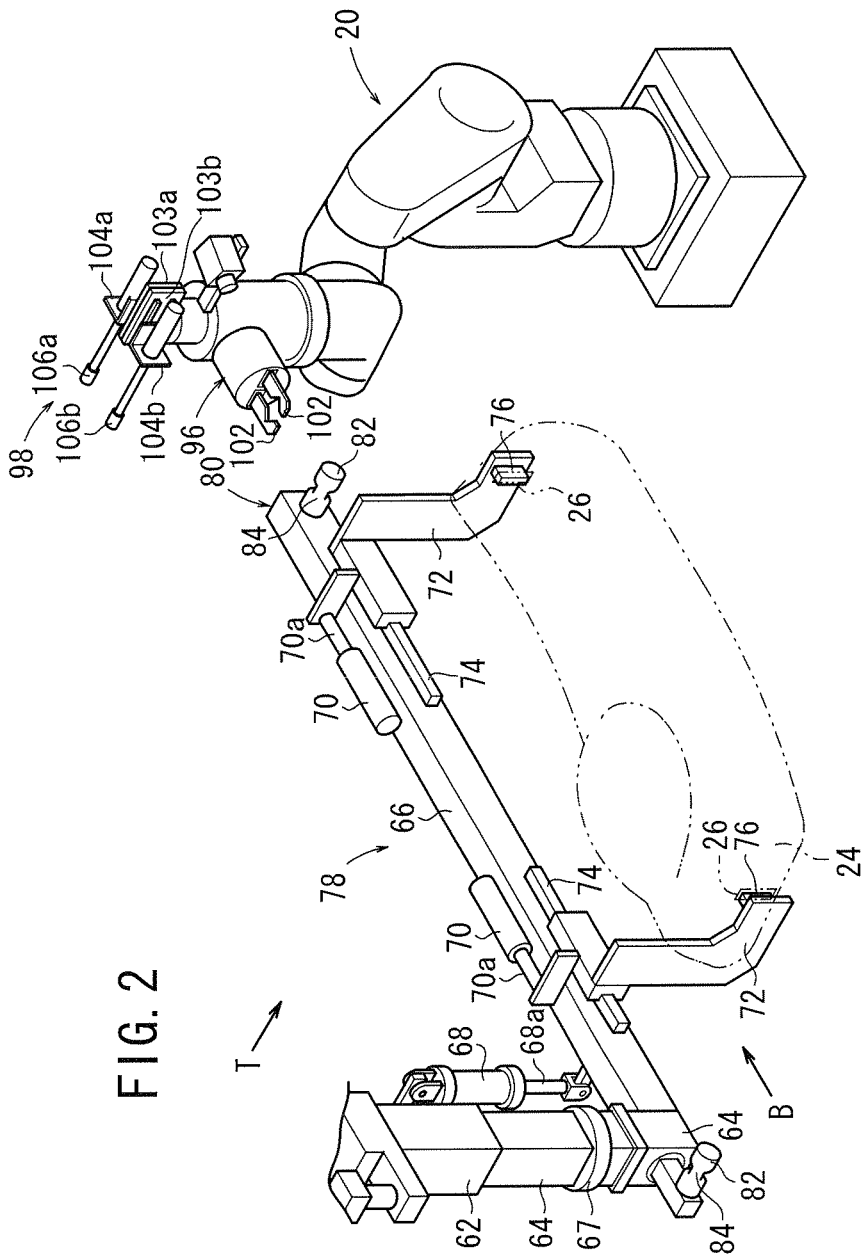
FIG. 2 is a perspective view of an assistive machine of the installing apparatus.

The assistive machine 18 is positioned above an instrument panel pickup station 28, and includes a first frame 30 extending along a direction (indicated by the arrow T) in which the automobile body 14 is fed. As shown in FIGS. 1 and 2, the first frame 30 supports thereon a forward cylinder 32 and a backward cylinder 34 that are disposed in opposing relationship to each other.

The first frame 30 has a pair of slide rails 38 extending in the direction indicated by the arrow T. A second frame 42 is supported on the slide rails 38 by a plurality of rollers 40 for movement in the direction indicated by the arrow T. A loading cylinder 44 and an unloading cylinder 46 are mounted on the second frame 42 in opposing relationship to each other in the direction indicated by the arrow B.

The second frame 42 has a pair of slide rails 50 extending in the direction indicated by the arrow B. A third frame 54 is supported on the slide rails 50 by a plurality of rollers 52 for movement in the direction indicated by the arrow B.

A first plate member 56 and a second plate member 58 are mounted on the third frame 54. The forward cylinder 32 has a rod 32a whose distal end is fixed to the first plate member 56, and the backward cylinder 34 has a rod 34a whose distal end is fixed to the first plate member 56. The loading cylinder 44 has a rod 44a whose distal end is fixed to the second plate member 58, and the unloading cylinder 46 has a rod 46a whose distal end is fixed to the second plate member 58.

A cylinder 60 which extends vertically is mounted on the third frame 54 and has a rod (not shown) extending downwardly therefrom and disposed in a slide guide 62. The rod of the cylinder 60 has a lower end coupled to a vertically movable end portion 64. An arm 66 which extends horizontally has an end supported on the vertically movable end portion 64. As described later, a force sensor 67 is mounted on the vertically movable end portion 64, for example, for detecting the load imposed by the instrument panel 24 supported by the arm 66 in the directions indicated by the arrow H, or a reactive force applied to the instrument panel gripping means 78.

The arm 66 is rotatable about its own axis by bearings (not shown) and can be fixed in a predetermined angular position by a lock cylinder 68. The lock cylinder 68 is supported on the slide guide 62 and has a rod 68a extending downwardly therefrom and coupled to the arm 66.

A pair of cylinders 70 oriented oppositely to each other is fixed to the arm 66. The cylinders 70 have respective rods 70a coupled respectively to instrument panel support arms 72. The instrument panel support arms 72 are movable along guide rails 74 mounted on the arm 66 and have respective distal ends on which there are mounted joint members 76 for engaging in the respective grip holes 26 of the instrument panel 24.

The pair of cylinders 70 and the pair of instrument panel support arms 72 make up the instrument panel gripping means 78. Operating levers 82 of a coupling means 80 are fixed respectively to the opposite ends of the arm 66. The operating levers 82 are substantially cylindrical in shape and have reduced-diameter grips 84 in their central portions.

Brake means 86 for positioning the second frame 42 in a give position are disposed on the second frame 42. The brake means 86 stop the second frame 42 at a desired position when the brake means 86 are pushed upwardly into sliding contact with the first frame 30. A first limit switch 88a for detecting a panel putting position and a second limit switch 88b for detecting a forward stroke end are disposed on the first frame 30 respectively at a distal end portion and a distal end of the first frame 30 in the direction indicated by the arrow T. A third limit switch 88c for detecting a home position is disposed on the first frame 30 at a rear end thereof in the direction indicated by the arrow T.

Brake means 86 are disposed on the third frame 54 at opposite ends thereof in the direction indicated by the arrow B. A fourth limit switch 88d for detecting a feed stroke end position and a fifth limit switch 88e for detecting a return stroke end position are disposed on the second frame 42 at opposite ends thereof in the direction indicated by the arrow B.

The right working robot 20 and the left working robot 22 are constructed identically to each other. Structural details of the working robot 20 will be described below, and those of the working robot 22 are denoted by identical reference characters and will not be described in detail below.

Figure 3:
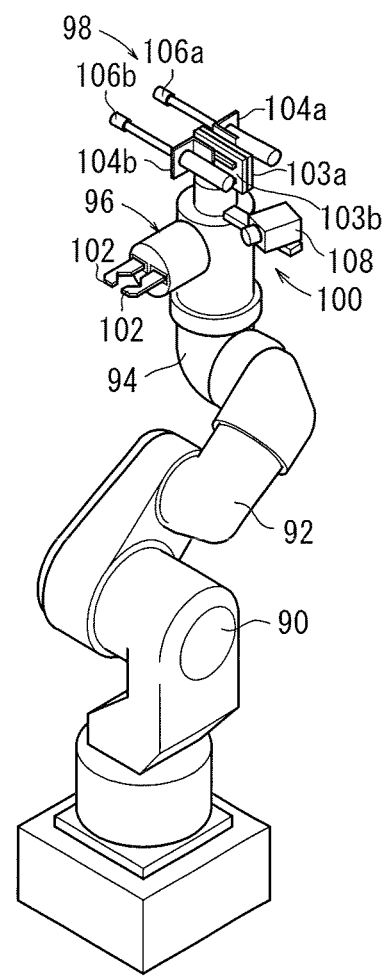
FIG. 3 is a perspective view of a working robot of the installing apparatus.

As shown in FIG. 3, the working robot 20 has a swingable robot body 90. The robot body 90 has an arm 92 with a wrist 94 on its distal end. A hand 96, a nut runner unit (bolt tightening means) 98 and an imaging unit 100 are mounted on the wrist 94.

The hand 96 has a pair of fingers 102 that are openable and closable by an actuator, not shown. The hand 96 and the operating levers 82 of the instrument panel gripping means 78 make up the coupling means 80. The hand 96 also serves as a means for gripping a bolt 110, to be described later.

The nut runner unit 98 includes a pair of rodless cylinders 103a, 103b mounted on the distal end of the wrist 94, and a pair of nut runners 106a, 106b mounted on the respective rodless cylinders 103a, 103b by sliders 104a, 104b. The imaging unit 100 comprises a CCD imaging camera (hereinafter simply referred to as "camera") 108 for confirming that the instrument panel is set in place and also confirming installed position errors.

As shown in FIG. 1, bolt stocks 112 which accommodate bolts 110 for installing instrument panels 24 to automobile bodies 14 and presetting tables 114 for aligning two bolts 110 taken out of the bolt stocks 112 are disposed in the vicinity of the working robot 20 and the working robot 22, respectively.

Figure 4:
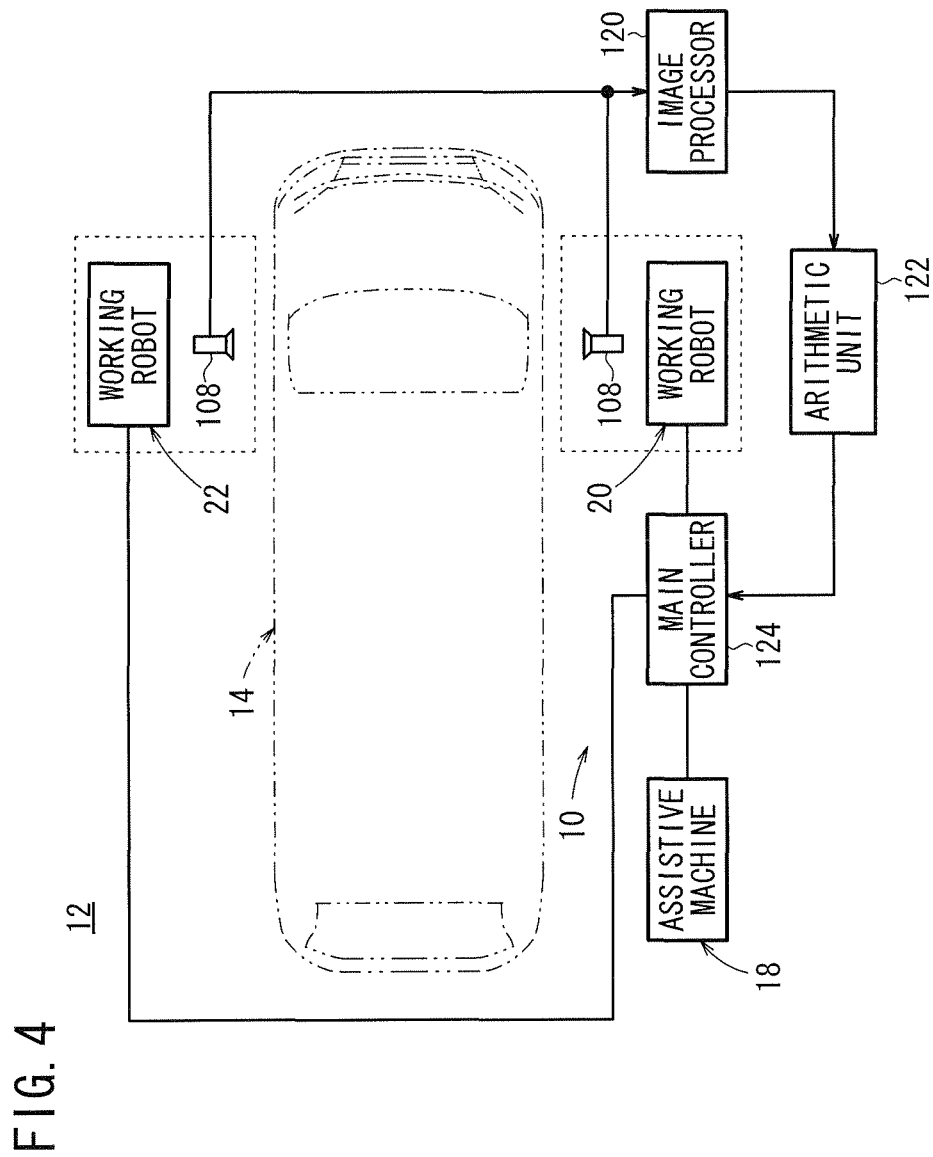
FIG. 4 is a block diagram of the installing apparatus.

As shown in FIG. 4, each of the cameras 108 of the working robots 20, 22 outputs image information representing an automobile body image, a set instrument panel position image, etc. to an image processor 120. The image processor 120 outputs the image information supplied from each of the cameras 108 to an arithmetic unit 122, which performs arithmetic operations on the image information. The arithmetic unit 122 outputs the detected vehicle body position and set instrument panel position to a main controller 124. Based on the input arithmetic information, the main controller 124 controls operation of the working robots 20, 22, and also controls operation of the assistive machine 18.

Operation of the installing apparatus 10 will be described below in relation to an installing method according to the present invention with reference to flowcharts shown in FIGS. 5 and 6 and a timing chart shown in FIG. 7.

Figure 5:
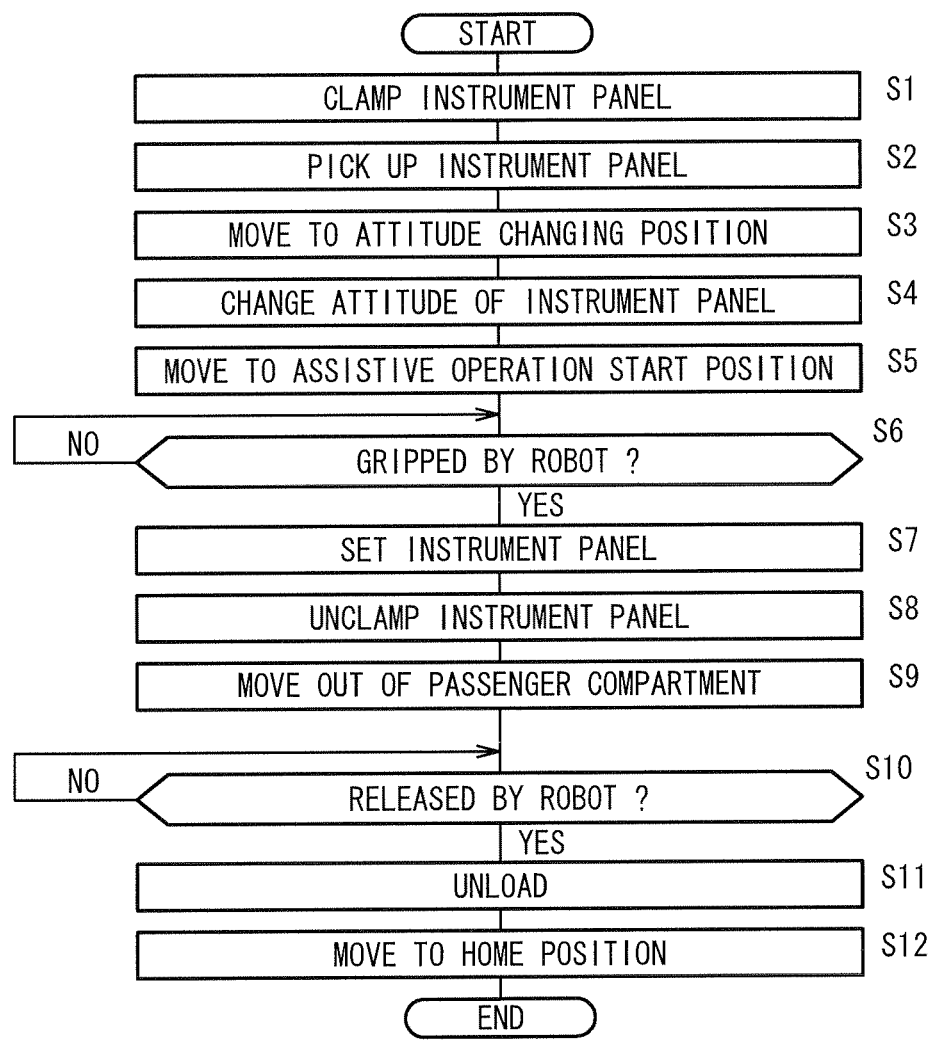
FIG. 5 is a flowchart of an operation sequence of the assistive machine.
Figure 6:
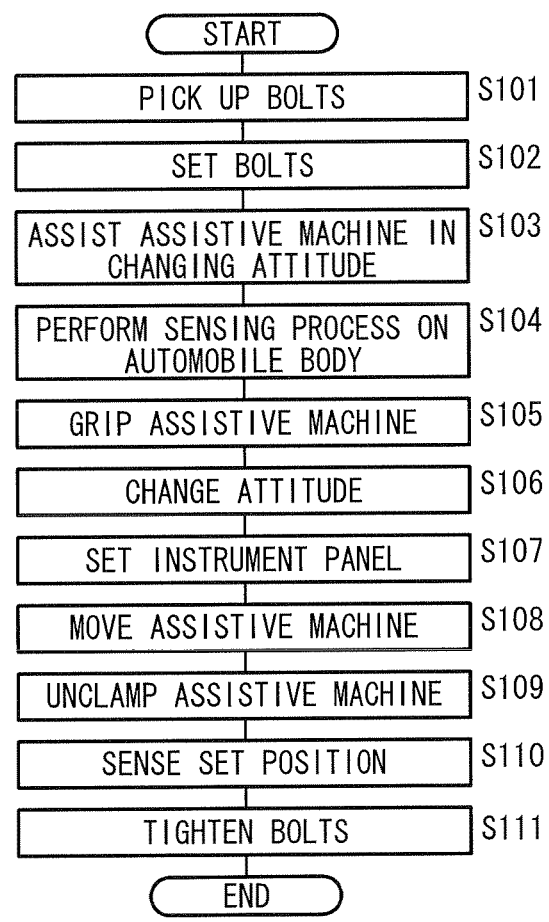
FIG. 6 is a flowchart of an operation sequence of the working robot.
Figure 7:
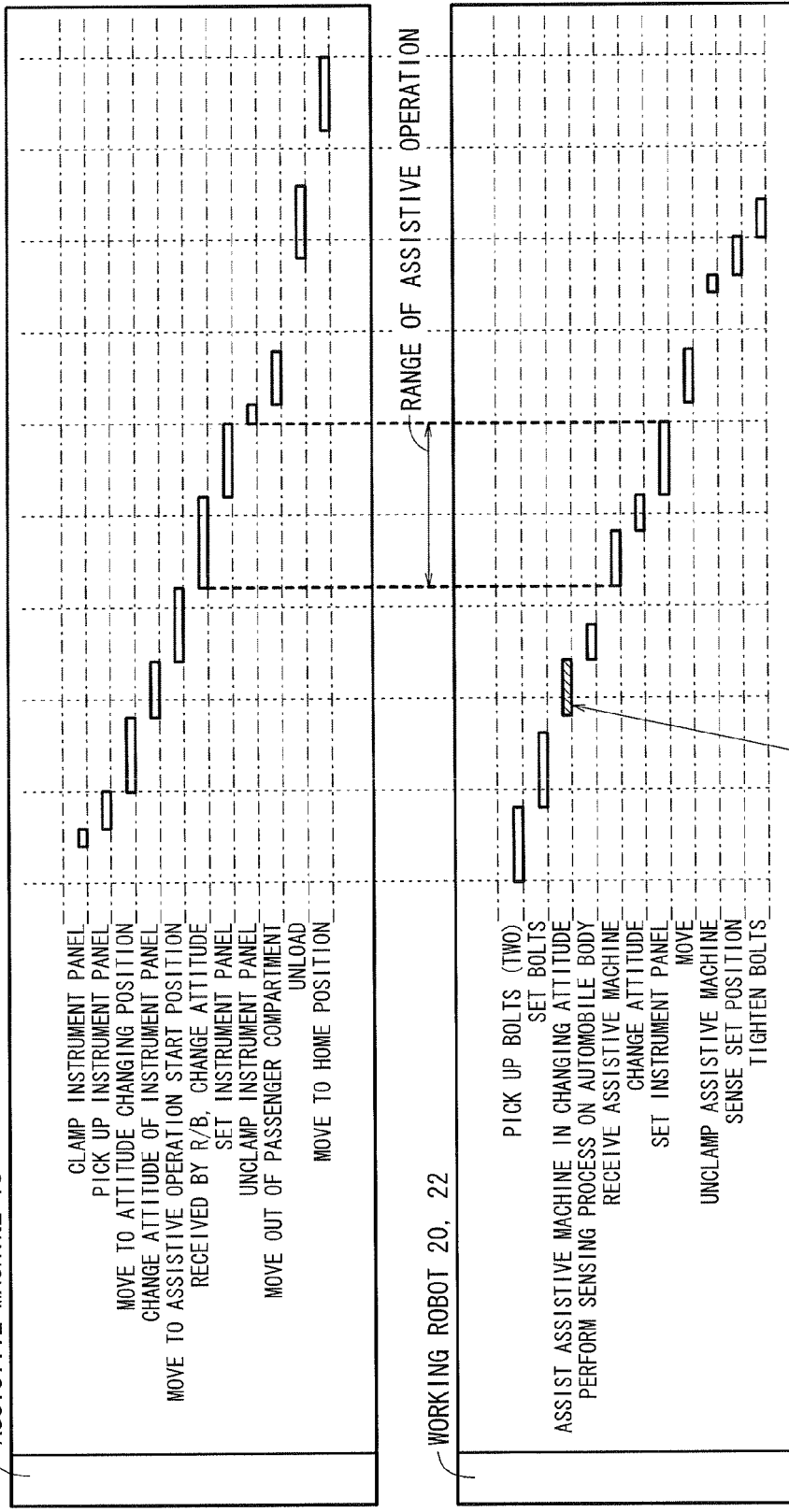
FIG. 7 is a timing chart of an installing method according to the present invention.

The operation of the assistive machine 18 is illustrated in FIG. 5, and the operation of the working robots 20, 22 is illustrated in FIG. 6. The assistive machine 18 and the working robots 20, 22 operate in relation to each other as shown in FIG. 7.

First, the operation of the assistive machine 18 will be described below. In the assistive machine 18, the instrument panel gripping means 78 is positioned above the instrument panel 24 disposed in the instrument panel pickup station 28. The cylinder 60 is actuated to cause the non-illustrated rod to lower the vertically movable end portion 64.

The instrument panel gripping means 78 mounted on the vertically movable end portion 64 is positioned in facing relation to the instrument panel 24 in the instrument panel pickup station 28. At this time, the lock cylinder 68 is turned on to prevent the rod 68a from being extended or contracted, thereby supporting the arm 66 nonrotatably.

The cylinders 70 are actuated to move the rods 70a, 70a toward each other until the instrument panel support arms 72 abut against the opposite sides of the instrument panel 24. Therefore, the joint members 76 are inserted into the respective grip holes 26 of the instrument panel 24, whereupon the instrument panel gripping means 78 grips the instrument panel 24 (step S1).

The cylinder 60 is reversely actuated to elevate the instrument panel gripping means 78 with the instrument panel 24 gripped thereby and hold the instrument panel gripping means 78 in a predetermined vertical position (step S2).

The forward cylinder 32 is actuated to advance the rod 32a in the direction indicated by the arrow T, pressing the first plate member 56 fixed to the rod 32a in the direction indicated by the arrow T. Therefore, the second frame 42 is moved along the slide rails 38 to a certain position in the direction indicated by the arrow T under rotation of the rollers 40. When the first limit switch 88a is turned on, the brake means 86 are pushed upwardly to stop the second frame 42 against movement (step S3).

In the stopped position, the fingers 102 of the hand 96 of the working robot 20 grip one of the operating levers 82 of the instrument panel gripping means 78. Since the operating levers 82 have the reduced-diameter grips 84 in their substantially central portions, the fingers 102 reliably grip the operating lever 82 at a given position by gripping the grip 84.

When the lock cylinder 68 is turned off and vented to the atmosphere, the hand 96 of the working robot 20 is operated, e.g., swung, rotated and moved in certain directions. The angular position of the arm 66 is now adjusted through the operating lever 82. The instrument panel 24 is changed in attitude (step S4). After the instrument panel 24 is placed in a given attitude, the lock cylinder 68 is turned on to prevent the rod 68a from being extended or contracted, thereby holding the arm 66.

A force sensor (not shown) may be mounted on the arm 66, and the lock cylinder 68 may be controlled such that a reactive force detected by the force sensor when the arm 66 is turned becomes zero or minutely small in level.

In step S5, the forward cylinder 32 is actuated to move the second frame 42 in the direction indicated by the arrow T. When the second limit switch 88b is turned on, the brake means 86 are pushed upwardly to an assistive operation start position. In the assistive operation start position, if it is judged that the instrument panel gripping means 78 is gripped by the hand 96 of the working robot 20 (step S6, YES), then process goes to step S7 in which a process of setting the instrument panel 24 in place is performed by the working robot 20 and the working robot 22.

Specifically, the assistive machine 18 switches from an automatic instrument panel feed mode to an assistive instrument panel feed mode. In an assistive action of the assistive machine 18, the instrument panel gripping means 78 which is gripping the instrument panel 24 is operated, and the working robot 20 puts the instrument panel 24 into the passenger compartment 14a of the automobile body 14.

Figure 8:
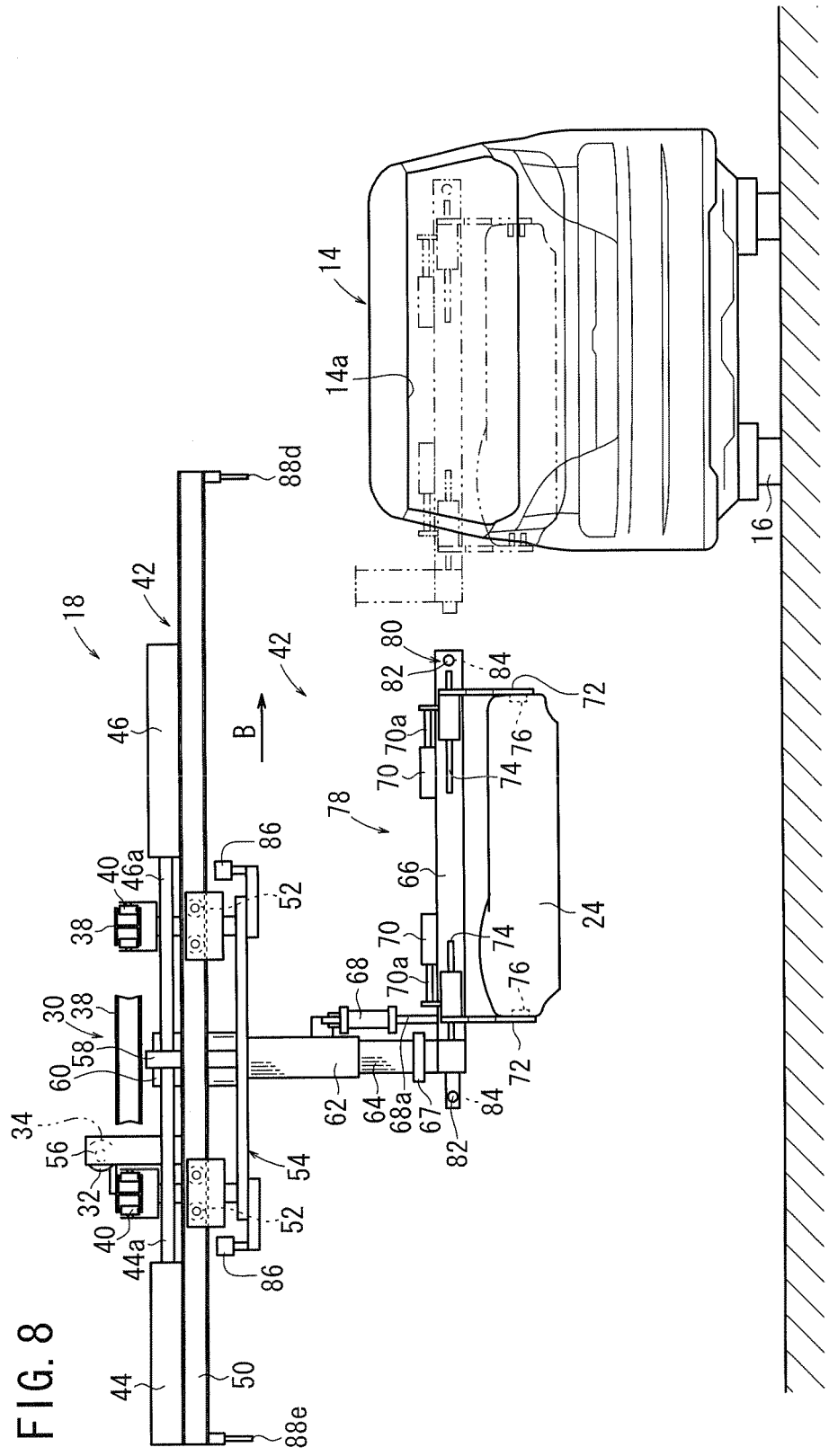
FIG. 8 is a view illustrative of the installing method.

As shown in FIG. 8, the loading cylinder 44 of the assistive machine 18 is actuated to press the second plate member 58 fixed to the distal end of the rod 44a in the direction indicated by the arrow B. Therefore, the third frame 54 is moved along the slide rails 50 of the second frame 42 in the direction indicated by the arrow B, thereby assisting the working robot 20 in putting the instrument panel 24 into the passenger compartment 14a of the automobile body 14.

Figure 9:
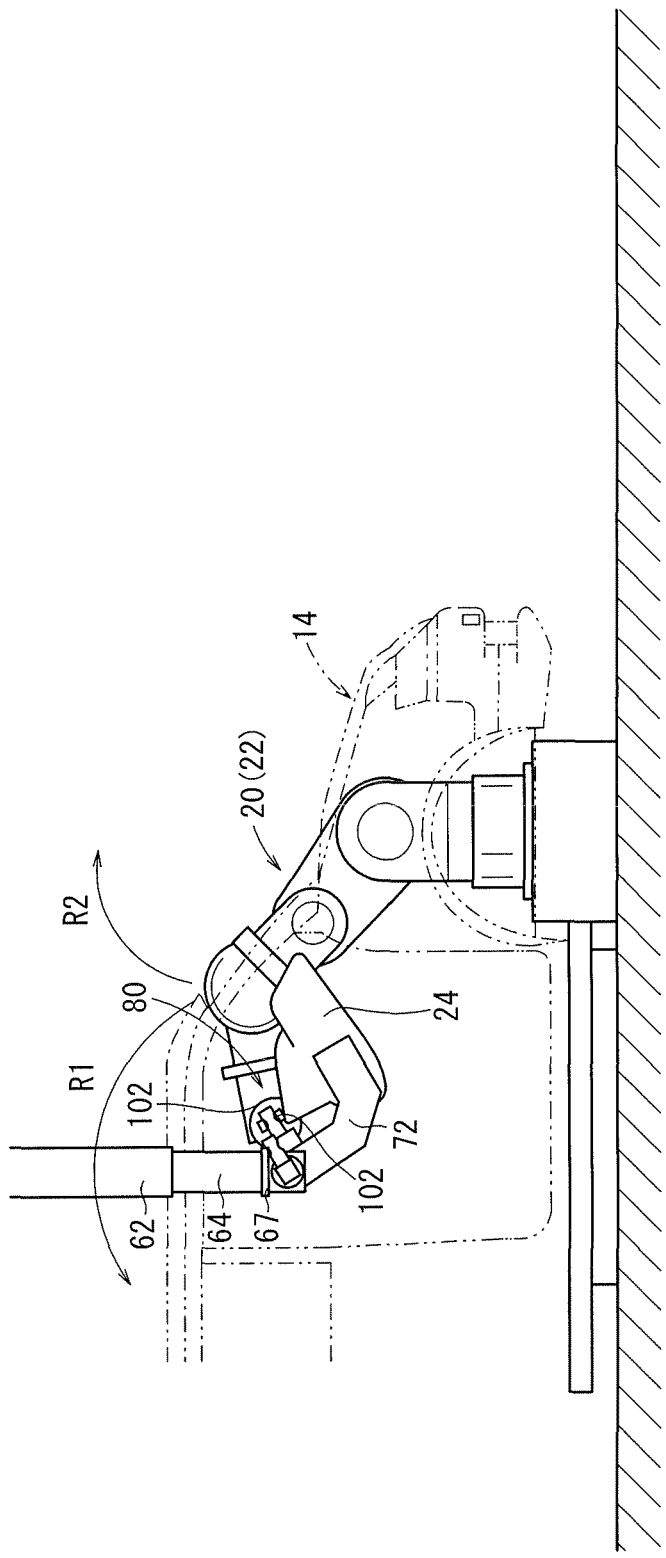
FIG. 9 is a view showing an operation of putting the instrument panel into the passenger compartment of an automobile.

As shown in FIG. 9, the hand 96 of the working robot 20 is moved to swing the instrument panel gripping means 78 in the direction indicated by the arrow R1 to change the attitude of the instrument panel 24 into a vehicle installation attitude. After putting the instrument panel 24 into the passenger compartment 14a of the automobile body 14, the hand 96 is moved to swing the instrument panel gripping means 78 in the direction indicated by the arrow R2 to change the attitude of the instrument panel 24 into a setting attitude.

While the working robot 20 is being operated as described above, the assistive machine 18 has switched to the assistive instrument panel feed mode. Accordingly, the force sensor 67 detects the load imposed by the instrument panel 24 supported by the arm 66 in the directions indicated by the arrow H, or a reactive force applied to the instrument panel gripping means 78. The forward cylinder 32, the backward cylinder 34, the loading cylinder 44 and the unloading cylinder 46 are controlled such that the load (reactive force) detected by the force sensor 67 may approach zero or a minutely-small level.

When the assistive machine 18 switches to the assistive instrument panel feed mode, all of the forward cylinder 32, the backward cylinder 34, the loading cylinder 44 and the unloading cylinder 46 may alternatively be vented to the atmosphere, i.e., turned off.

After the working robots 20, 22 have tightened bolts on the instrument panel 24, as described later, the instrument panel gripping means 78 releases the instrument panel 24. Specifically, as shown in FIG. 2, the cylinders 70 are reversely actuated to move the instrument panel support arms 72 in directions away from the opposite sides of the instrument panel 24. The joint members 76 are disengaged out of the grip holes 26, thereby releasing the instrument panel 24 (step S8).

The instrument panel gripping means 78 is moved out of the passenger compartment 14a by the working robot 20 and, if necessary, the working robot 22. In the assistive machine 18, the unloading cylinder 46 is actuated to press the second plate member 58 in the direction which is opposite to the direction indicated by the arrow B. Therefore, the third frame 54 is moved in unison with the instrument panel gripping means 78 in the direction which is opposite to the direction indicated by the arrow B, i.e., in the direction out of the passenger compartment 14a, assisting the working robots 20, 22 in moving the instrument panel gripping means 78 out of the passenger compartment 14a (step S9).

When the instrument panel gripping means 78 is moved out of the passenger compartment 14a, the working robots 20, 22 release the instrument panel gripping means 78 (step S10, YES). Thereafter, the instrument panel gripping means 78 is unloaded (carried out) from the instrument panel installing station (step S11).

Specifically, the assistive machine 18 switches from the assistive instrument panel feed mode to the automatic instrument panel feed mode. The backward cylinder 34 is actuated to press the first plate member 56 in the direction which is opposite to the direction indicated by the arrow T. Therefore, the second frame 42 is moved in unison with the third frame 54 in the direction which is opposite to the direction indicated by the arrow T. When the instrument panel gripping means 78 reaches its home position, the third limit switch 88c is turned on, thereby inactivating the assistive machine 18 (step S12).

Figure 10:
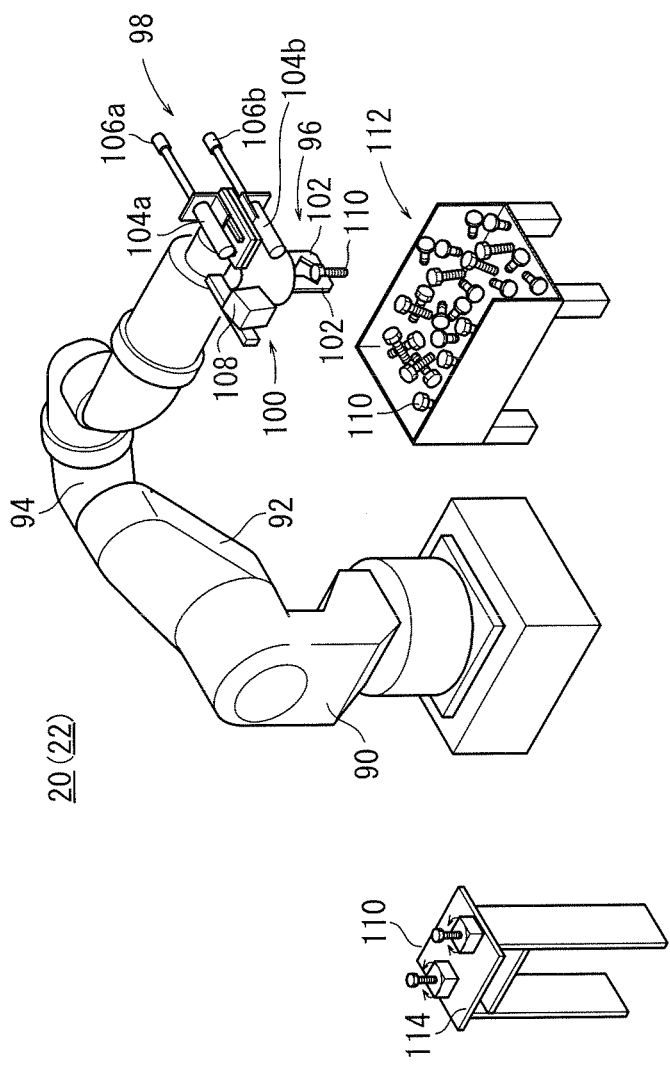
FIG. 10 is a view showing a manner in which the working robot takes out a bolt.

The operation of the working robot 20 will be described below. As shown in FIG. 10, the hand 96 mounted on the wrist 94 of the working robot 20 grips bolts 110 accommodated in the bolt stock 112, and places the bolts 110 in an upstanding attitude in alignment with each other on the presetting table 114 (step S101 in FIG. 6).

Figure 11:
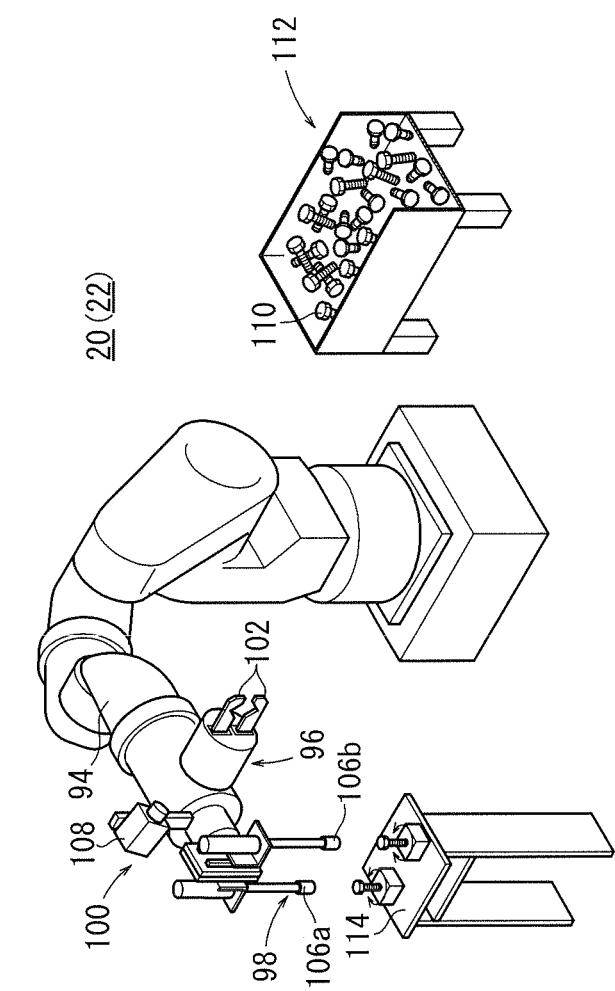
FIG. 11 is a view showing a manner in which bolts on a presetting table are received by nut runners.

As shown in FIG. 11, the bolts 110 that are held in the upstanding attitude in alignment with each other on the presetting table 114 are rotated into phase with the respective nut runners 106a, 106b of the nut runner unit 98. Thereafter, the nut runners 106a, 106b hold the respective bolts 110 (step S102).

After the working robot 20 has assisted the assistive machine 18 in changing the attitudes (see step S4 in FIG. 5) in step S103, the working robot 20 performs a sensing process on the automobile body 14 in step S104. Specifically, the camera 108 of the imaging unit 100 mounted on the working robot 20 captures an image of body reference holes defined in the automobile body 14, and inputs captured image information to the image processor 120. Based on the input image information, the arithmetic unit 122 determines whether the positions of the body reference holes are proper or not, and, if necessary, outputs a corrective value to the main controller 124.

After the hand 96 of the working robot 20 has gripped the operating lever 82 of the assistive machine 18 (step S105), the hand 96 operates the operating lever 82 to change the attitude of the instrument panel 24 into the vehicle installation attitude (step S106). The instrument panel 24 in the vehicle installation attitude is set in the passenger compartment 14a (step S107).

After having set the instrument panel 24, process goes to step S108 in which the working robot 20 moves the instrument panel gripping means 78 out of the passenger compartment 14a in an assistive action of the assistive machine 18 (step S108), and then releases the operating lever 82 (step S109).

The working robot 20 then senses the set position of the instrument panel 24 with the camera 108 (step S110). If the set position sensing process indicates that the body reference holes and the reference holes of the instrument panel 24 deviate in position from each other, then the working robot 20 positionally adjusts the instrument panel 24.

Next, process goes to step S111 in which the bolts 110 held by the respective nut runners 106a, 106b of the nut runner unit 98 are threaded into the body reference holes and the instrument panel reference holes, thereby installing the instrument panel 24 on the automobile body 14.

Specifically, the nut runners 106a, 106b are disposed in a retracted position by the rodless cylinders 103a, 103b. The rodless cylinder 103a, for example, is actuated to move the nut runner 106a forward. The nut runner 106a is then rotated to thread the bolt 110 held thereby into one of the body reference holes and one of the instrument panel reference holes. At this time, the nut runner 106b is retracted out of interference with the operation of the nut runner 106a.

After the nut runner 106a finishes its bolt tightening operation, the rodless cylinder 103a is actuated to retract the nut runner 106a. The rodless cylinder 103b is actuated to move the nut runner 106b forward. The nut runner 106b is then rotated to thread the bolt 110 into the other body reference hole and the other instrument panel reference hole.

The working robot 22 operates in the same manner as the working robot 20, and the operation of the working robot 22 will not be described in detail below. The processing of step S103 is carried out by only the working robot 20.

According to the first embodiment, the assistive machine 18 has an assistive function to bear the weight of the instrument panel 24 when the working robot 20 installs the instrument panel 24 into the passenger compartment 14a after the instrument panel gripping means 78 has gripped and picked up the instrument panel 24 from the instrument panel pickup station 28 and automatically fed the instrument panel 24.

Therefore, the load imposed on the working robot 20 by the instrument panel 24 is effectively reduced when the working robot 20 puts and sets the instrument panel 24 into the passenger compartment 14a. The working robot 20 can thus be reduced in size, so that the installing apparatus 10 can easily be reduced in size and simplified as a whole, and the process of installing the instrument panel 24 can be performed quickly and efficiently.

The weight of the instrument panel 24 is borne by the assistive machine 18. Therefore, the effect of inertia is reduced, and the process of positioning the heavy instrument panel 24 is greatly simplified by the coaction of the left and right working robots 20, 22.

When the working robots 20, 22 are to be shut down for maintenance, etc., the working robots 20, 22 are retracted from the instrument panel installing station. Then, a worker can easily install the instrument panel 24 in the assistive action of the assistive machine 18.

Furthermore, each of the working robots 20, 22 has the nut runner unit 98 for fastening with bolts the instrument panel 24 at an instrument panel installing position in the passenger compartment 14a. Therefore, the floor space occupied by the entire equipment is reduced, resulting in an increased space efficiency.

In the first embodiment, the hand 96, the nut runner unit 98 and the imaging unit 100 are mounted on each of the working robots 20, 22. However, the invention is not limited to such a structure. The working robots 20, 22 may have at least either the hand 96 or the nut runner unit 98.

Figure 12:
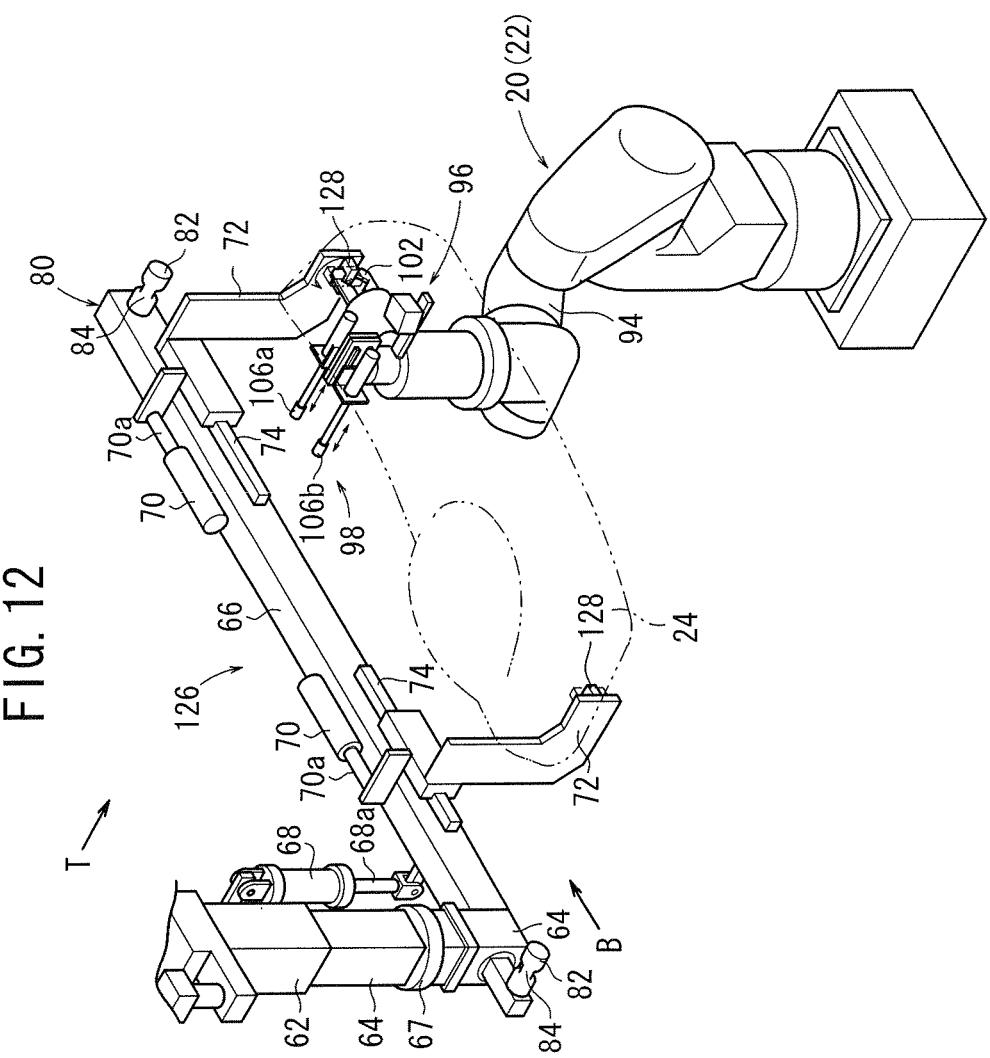
FIG. 12 is a perspective view of an instrument panel gripping means of an apparatus for installing a vehicle instrument panel according to a second embodiment of the present invention.

FIG. 12 is a perspective view of an instrument panel gripping means 126 of an apparatus for installing a vehicle instrument panel according to a second embodiment of the present invention. Those components of the instrument panel gripping means 126 which are identical to those of the instrument panel gripping means 78 of the installing apparatus 10 according to the first embodiment are denoted by identical reference characters, and will not be described in detail below.

The instrument panel gripping means 126 has a pair of instrument panel support arms 72 that are openable and closable by the cylinders 70, 70. Movable joint members 128 are mounted on the instrument panel support arms 72. The movable joint members 128 have a rectangular cross-sectional shape and can switch between installation angular positions that are angularly spaced from each other by 90°.

The hands 96 of the working robots 20, 22 grip the movable joint members 128. The movable joint members 128 can switch to either one of the two angular positions depending on the configuration, etc. of the instrument panel 24. According to the second embodiment, the installing apparatus can easily cope with instrument panels 24 of different types.

Figure 13:
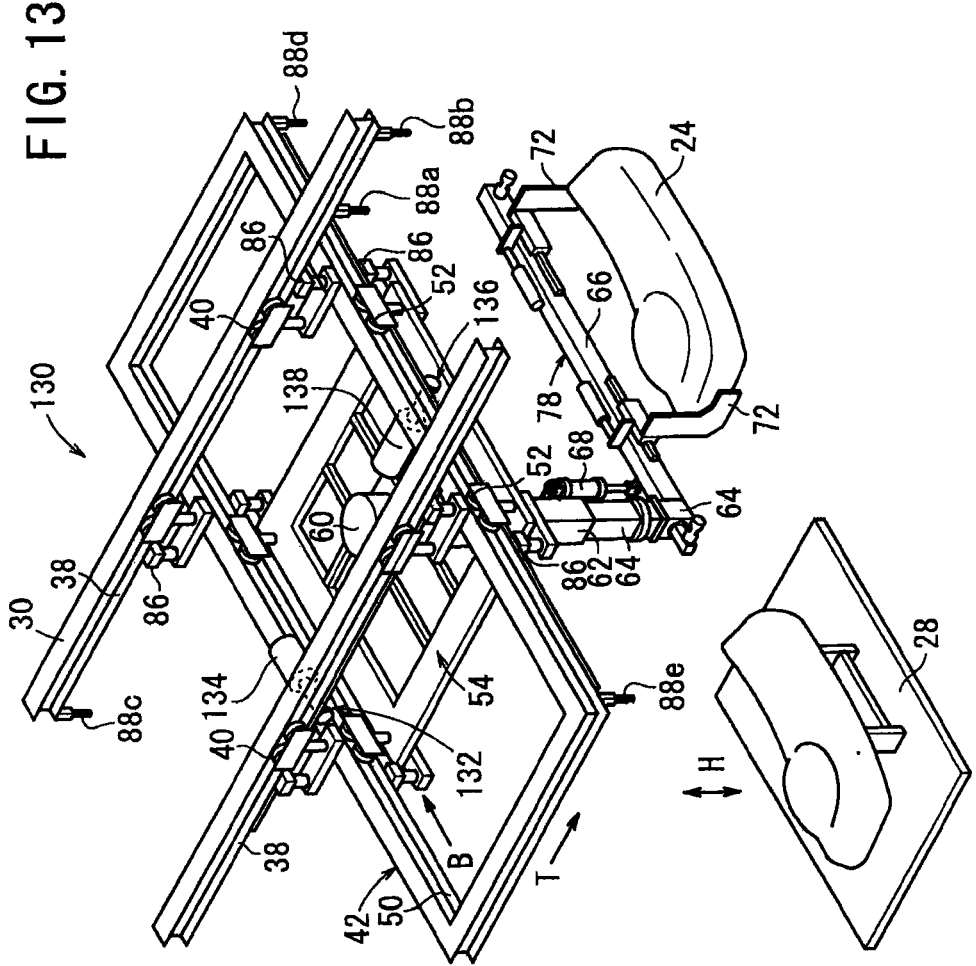
FIG. 13 is a perspective view of an assistive machine of an apparatus for installing a vehicle instrument panel according to a third embodiment of the present invention.
Figure 14:
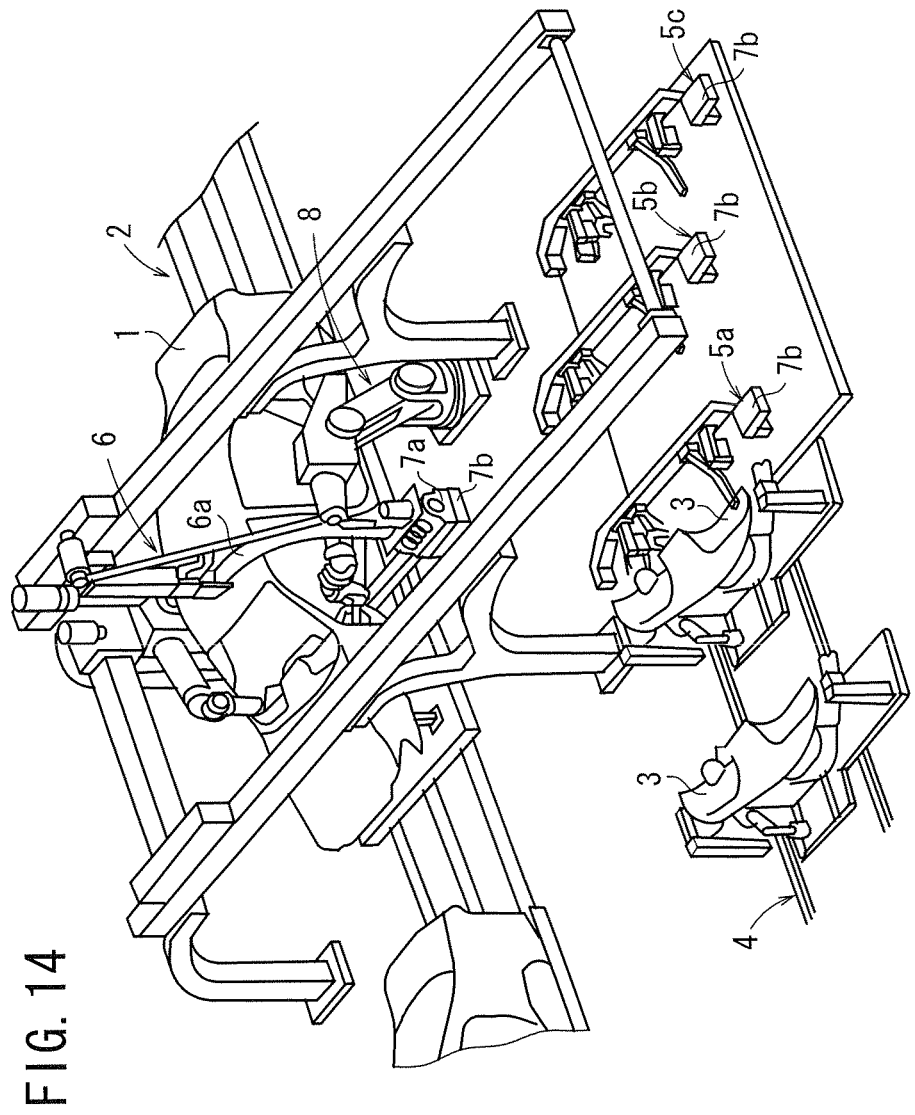
FIG. 14 is a perspective view of an installing apparatus disclosed by the background art.

FIG. 13 is a perspective view of an assistive machine 130 of an apparatus for installing a vehicle instrument panel according to a third embodiment of the present invention. Those components of the assistive machine 130 which are identical to those of the assistive machine 18 of the installing apparatus 10 according to the first embodiment are denoted by identical reference characters, and will not be described in detail below.

The assistive machine 130 includes a propulsive motor 134 that is movable back and forth along a lower portion of the first frame 30 by a rack and pinion means 132. The propulsive motor 134 is fixed to the second frame 42. The second frame 42 supports a propulsive motor 138 that is movable back and forth by a rack and pinion means 136 in the direction indicated by the arrow B. The propulsive motor 138 is fixed to the third frame 54.

According to the third embodiment, the instrument panel gripping means 78 for gripping the instrument panel 24 is assistively actuated in the direction indicated by the arrow T and the direction indicated by the arrow B when the propulsive motors 134, 138 are energized. Based on ON/OFF signals from the first through fifth limit switches 88a through 88e, the instrument panel gripping means 78 can be positioned accurately and reliably at a desired position.

Specifically, the instrument panel 24 is gripped by the instrument panel gripping means 78. After the instrument panel gripping means 78 has reached an upper end position, the propulsive motor 134 is energized to cause the second frame 42 and the third frame 54 to move the instrument panel gripping means 78 in the direction indicated by the arrow T.

When the first limit switch 88a is turned on, the propulsive motor 134 is de-energized, thereby placing the instrument panel 24 in a panel putting position. For returning the instrument panel gripping means 78 to its home position, the instrument panel gripping means 78 unclamps the instrument panel 24 and the working robots 20, 22 unclamp the instrument panel gripping means 78, whereupon the propulsive motor 134 is reversed. The third limit switch 88c is turned on, thereby detecting the return of the instrument panel gripping means 78 to its home position.

For putting the instrument panel 24 into the passenger compartment 14a, the instrument panel gripping means 78 grips the instrument panel 24 and completes the conversion of the attitude of the instrument panel 24. With the first limit switch 88a turned on, the propulsive motor 138 is energized.

For unloading the instrument panel gripping means 78, the instrument panel gripping means 78 unclamps the instrument panel 24 and the working robots 20, 22 release the instrument panel gripping means 78. With the first limit switch 88a turned on, the propulsive motor 138 is reversed.

When the fifth limit switch 88e is turned on, the unloading of the instrument panel gripping means 78 out of the automobile body 14 is detected. Then, the propulsive motor 134 is energized. When the third limit switch 88c is turned on, the return of the instrument panel gripping means 78 to its home position is detected.

The invention claimed is:

1. An apparatus for installing a vehicle instrument panel in a passenger compartment of a motor vehicle, comprising:
   a first working mechanism including instrument panel gripping means for gripping the instrument panel, and automatically feeding the instrument panel, the first working mechanism having an assistive function to bear the weight of the instrument panel; and
   a second working mechanism for operating the instrument panel gripping means to put the instrument panel into the passenger compartment, the second working mechanism including coupling means for being detachably coupled to the instrument panel gripping means.

2. An apparatus according to claim 1, wherein the second working mechanism is disposed on each side of the vehicle in a transverse direction thereof.

3. An apparatus according to claim 1, wherein the second working mechanism includes a sensor for confirming an instrument panel installing position in the vehicle.

4. An apparatus for installing a vehicle instrument panel in a passenger compartment of a motor vehicle, comprising:
   a first working mechanism including instrument panel gripping means for gripping the instrument panel, and automatically feeding the instrument panel, the first working mechanism having an assistive function to bear the weight of the instrument panel; and
   a second working mechanism for operating the instrument panel gripping means to put the instrument panel into the passenger compartment, the second working mechanism including coupling means for being detachably coupled to the instrument panel gripping means;
   wherein the second working mechanism includes bolt tightening means for fastening with bolts the instrument panel at an instrument panel installing position in the vehicle.

5. An apparatus according to claim 4, wherein the second working mechanism is disposed on each side of the vehicle in a transverse direction thereof.

6. An apparatus according to claim 4, wherein the second working mechanism includes a sensor for confirming the instrument panel installing position in the vehicle.

7. A method of installing a vehicle instrument panel in a passenger compartment of a motor vehicle, comprising the steps of:
gripping the instrument panel with instrument panel gripping means of a first working mechanism and automatically feeding the instrument panel to an operation start position of a second working mechanism;
coupling the second working mechanism to the instrument panel gripping means when the instrument panel is fed to the operation start position;
operating the instrument panel gripping means with the second working mechanism to put the instrument panel into the passenger compartment while the weight of the instrument panel is being borne by the first working mechanism; and
fixing the instrument panel in the passenger compartment.

8. A method according to claim 7, further comprising the steps of:
confirming an instrument panel installing position in the vehicle with a sensor mounted on the second working mechanism; and
controlling operation of the second working mechanism based on a detected signal from the sensor.

9. A method of installing a vehicle instrument panel in a passenger compartment of a motor vehicle, comprising the steps of:
gripping the instrument panel with instrument panel gripping means of a first working mechanism and automatically feeding the instrument panel to an operation start position of a second working mechanism;
coupling the second working mechanism to the instrument panel gripping means when the instrument panel is fed to the operation start position;
operating the instrument panel gripping means with the second working mechanism to put the instrument panel into the passenger compartment while the weight of the instrument panel is being borne by the first working mechanism; and
fastening with bolts the instrument panel at an instrument panel installing position in the passenger compartment with bolt tightening means mounted on the second working mechanism.

10. A method according to claim 9, further comprising the steps of:
confirming the instrument panel installing position with a sensor mounted on the second working mechanism; and
controlling operation of the second working mechanism based on a detected signal from the sensor.

* * * * *